Figure 4:
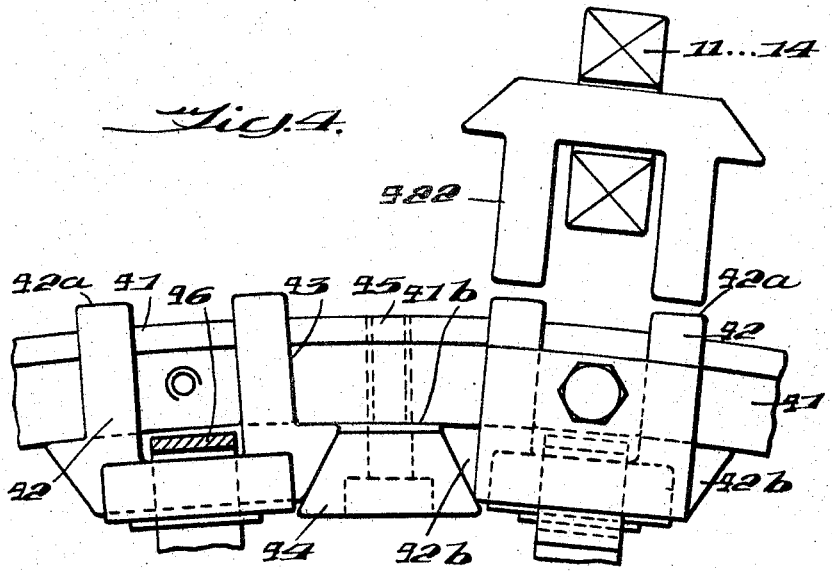

March 25, 1969
W. MERHOF ET AL
3,435,327
APPARATUS FOR MONITORING RECTIFIER COMPONENT OF ROTOR MOUNTED
EXCITER SYSTEM FOR SYNCHRONOUS MACHINE
Filed Aug. 23, 1966
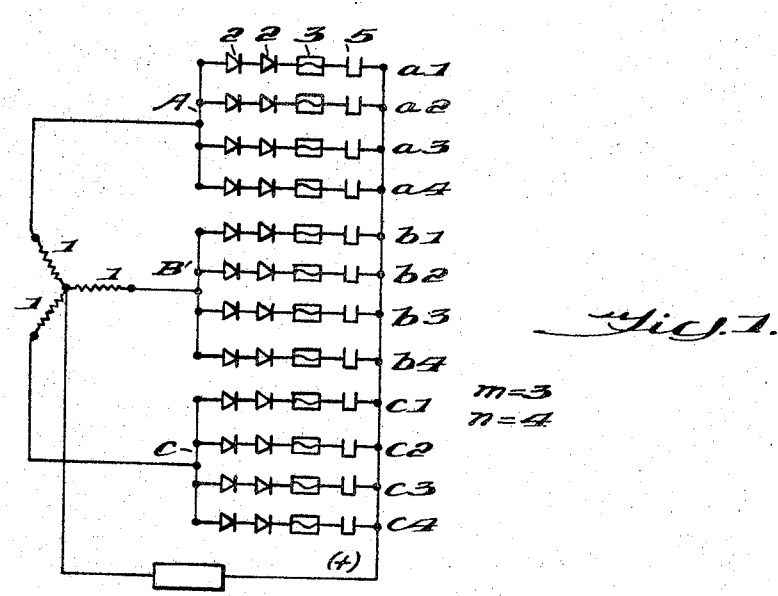
Fig. 1.
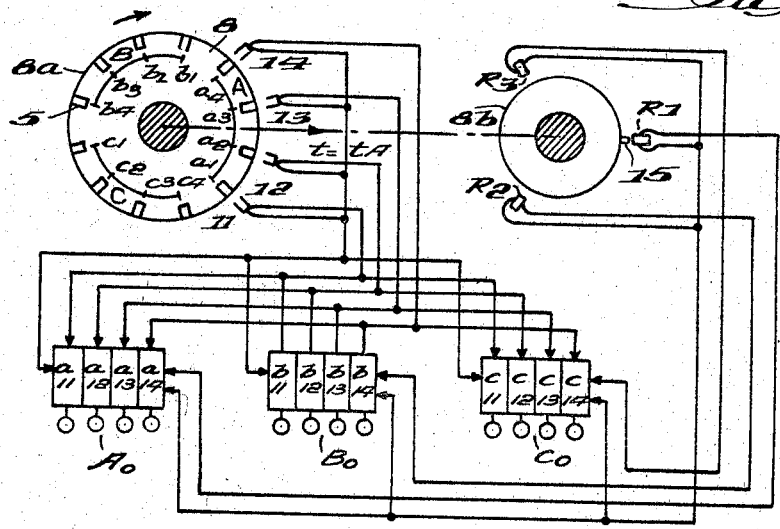
Fig. 2.
Fig. 3.
INVENTORS
Wilfried Merhof
Bruno Stadler
BY Pierce, Scheffler & Parker
ATTORNEYS INVENTORS
Wilfried Merhof
Bruno Stadler United States Patent Office 3,435,327
Patented Mar. 25, 1969

3,435,327
APPARATUS FOR MONITORING RECTIFIER COMPONENT OF ROTOR MOUNTED EXCITER SYSTEM FOR SYNCHRONOUS MACHINE
Wilfried Merhof, Baden, and Bruno Stadler, Wettingen, Switzerland, assignors to Aktiengesellschaft Brown, Boveri & Cie, Baden, Switzerland, a joint-stock company
Filed Aug. 23, 1966, Ser. No. 574,360
Claims priority, application Switzerland, Aug. 26, 1965, 12,020/65
Int. Cl. H02p 9/30; H02k 11/00
U.S. Cl. 322—99         7 Claims The present invention relates to rotating electrical machinery of the synchronous type such as alternators which are excited by means of a rotating magnetic field, the main windings of the machine in which the voltage is generated being stationary.

More particularly, the invention relates to that particular class of synchronous machine construction wherein the direct current necessary for supplying the windings on the rotor to produce the rotating magnetic field is conducted to those windings in a so-called slip ring-free manner. In such arrangement, the field producing current is initially generated in the form of an alternating current which is produced by an alternating current generator whose armature is arranged on the rotor shaft, or is a part thereof. A rotating rectifier, likewise arranged on the shaft, effects the transformation of the alternating current into direct current. We are thus dealing here with a self-contained electrical rotating system which permits the field winding to be fed wtih direct current without slip rings and commutators.

The rotating rectifier consists of semiconductor-rectifier elements which are combined into $m$ groups, depending on the selected circuit type, each group being in turn divided into a number $n$ of parallel current paths applied to the same voltage. For protection against internal short circuit, a fuse is arranged for each current path in series with the rectifier elements. In general, the number $n$ of parallel current paths per group is so selected that, in case of a defect of one or more fuses, the remaining current paths are not ever loaded with regard to the rectifier elements. If necessary, a temporary power reduction will be effected up to a certain degree, particularly in large turbogenerators, to shut off the current suddenly when the number of admissible fuse defects per switching group is exceeded for normal operation.

A prerequisite for this desirable method of operation is a monitoring device which supplies information at any time about the present operating state of the rectifier. Automatic indication, working without contacts, is another requirement for the monitoring device. Beyond that it should be possible to give all orders for power reduction or disconnection.

Various arrangements are known which concern the monitoring of a rotating rectifier. One known arrangement uses the blocking voltage formed during the blocking phase of the rectifier at the terminals of a defective fuse to magnetize an inductor, the fuses combined per switching group inducing a signal whose amplitude represents a measure for the number of defective fuses. But oscillations can cause false readings. It has also been suggested to magnetize individual inductors by means of these voltages. This system is not satisfactory because there are cases possible where no blocking voltage appears at the terminals of the fuse, despite interruption of the current path, for example, in a disconnection in the current path or when a rectifier element burns out. In addition, the entire measuring system on the rotor side is not separated galvanically from the exciter circuit, which increases the risks of an insulation defect on the rotor to an unjustifiable extent considering the great acceleration forces.

It is a principal object of the present invention to monitor the individual current paths of the rotating rectifiers provided with fuses, contact-free in an arrangement for the slip ring-free excitation of a synchronous machine.

The invention concerns an arrangement in a synchronous machine excited without slip rings for monitoring the current in the current paths of the rotating exciter-rectifiers of $m$ groups (A, B, C.) with $n$ parallel current paths each ($a1, a2, a3 \ldots b1, b2, b3$), and with means for the production of signals which are tapped at the rotor shaft by induction and stationary, and where the signals are plotted in a plotting apparatus depending on the number and position of possible rectifier defects, $m \cdot n$ magnetizable cores being arranged on the circumference of the rotating rotor shaft carrier corresponding to the $m \cdot n$ current paths.

The invention consists in that the magnetization of each core is effected in the undisturbed state by the current of the respective current path, $n$ stationary tapping coils being arranged at equal intervals on a first circumferential circle opposite these cores in such a way their maximum induction takes place in the range of the maximum magnetization of the cores, and that an inducing iron core is arranged on a second circumferential circle on the carrier, and that $m$ equally distributed stationary tapping coils are arranged above this circumferential circle, and that the stationary coils above the two circumferential circles are connected with one input each to an AND-gate of $m \cdot n$ plotting channels of the plotting apparatus.

The invention will now be described more fully on the basis of one suitable embodiment and the accompanying drawings wherein:

FIG. 1 shows a semiconductor rectifier circuit;
FIG. 2 shows the monitoring arrangement;
FIG. 3 shows the principal circuit diagram of a plotting channel; and
FIGS. 4, 5 and 6, 7 respectively show two embodiments of the magnetizing cores.

The embodiment is based on an exciter-rectifier-system in a three-phase star circuit for a synchronous machine excited without slip rings.

With reference now to FIG. 1, 1 denotes the rotating, three-phase induced windings of an induction machine which rotates with the rotor of the synchronous machine. The stator winding of the induction machine acts as a D-C exciter winding. The rotating exciter-rectifier has thus $m=3$ switching groups (ABC), each switching group has $n=4$ current paths ($a1, a2, a3, a4; b1, b2, b3, b4; c1 \ldots$). Each current path has two series-connected semiconductor rectifiers 2 and a fuse 3. Altogether there are $m \cdot n = 12$ current paths.

FIG. 2 shows the means for the production of signals which are tapped by induction from the rotor shaft and which are plotted in a stationary manner. To this end a magnetizable iron core 5 is associated with each current path. All $m \cdot n$ cores are arranged at equal intervals along a circumferential circle on a carrier 8. In the undisturbed state, that is, in normal operation, each core is magnetized by the current in the associated current path. Opposite the rotating cores 5 are arranged $n$ stationary magnetizable cores with tapping coils. They have the same division as the division of the cores on the carrier. The tapping coils 11 to 14 are arranged on the first circumferential circle 8a and can be magnetically coupled with the rotating cores 5 over the air gap in such a way that they are brought by turning in circumferential direction to the range of the maximum induction of the cores 5 of the same phase group $m$. In this range voltage, impulses are induced in the tapping coils 11 to 14 due to the rotation of the cores 5.

If the phase group A carries current, for example, the respective magnet cores 5 are all magnetized to the maximum degree on the pole arc points $a1$, $a2$, $a3$, $a4$ in the undisturbed state, and the tapping coils 11, 12, 13, 14 are at this moment $tA$ exactly opposite the pole arc points, a plottable impulse is induced simultaneously in all tapping coils 11 to 14.

On a second circumferential circle $8b$ is arranged on the carrier 8 an inducing iron core 15. This iron core can be a permanent magnet which produces the necessary magnetic field. In its place it is also possible to premagnetize the core of the tapping coil with direct current so that a voltage is also induced in the tapping coil when the iron core 15 passes by. Opposite this iron core are arranged $m=3$ stationary tapping coils R1, R2, R3, provided with iron cores, which are uniformly distributed over the circumference. The core 15 is opposite the coil R1 just at the moment when an impulse is induced simultaneously in all tapping coils 11 to 14 by the cores $a1$ to $a4$.

In a corresponding manner impulses are induced in the conduction range of the phase groups B and C at equidistant time intervals $tB$ and $tC$ in all cores 5 and in all tapping coils 11 to 14 and the corresponding coils R2 and R3 belonging to the corresponding groups.

The tapping coils 11 to 14 as well as the tapping coils R1 to R3 are switched to the plotting apparatus. The latter contains plotting channels $a11$ to $a14$, $b11$ to $b14$, $c11$ to $c14$, combined in $m=3$ groups ($A_0$, $B_0$, $C_0$) of $n=4$ plotting channels each. Each tapping coil 11 to 14 is switched to a first input connection of an AND gate in each plotting channel. Each of the tapping coils R1 to R3 is switched to a respective second input connection of the AND-gates of a group $A_0$, $B_0$, $C_0$. Connected to the outputs of each plotting channel are pilot lamps L.

In the input lines to the plotting channels $a11$ to $c14$ are arranged impulse converters (A/C converters) 21, which convert the impulses of the tapping coils into rectangular impulses for the input into the AND gates. The design of a plotting channel (for example, $a11$), as it is provided for each current path, is shown in FIG. 3.

The input lines from the tapping coils (11 to 14) and (R1 to R3) respectively arrive each on an A/C converter 21 with which the amplitude- and impulse form necessary for the gates 22 is obtained. From the impulses induced in the tapping coils 11 to 14, which are formed in all channels on the AND gate 22, those on the monostable multivibrator 23 are transmitted with adjustable breaking delay which coincide in time with the reference impulse, for example, of R1. This is the case when the cores of the current paths $a1$–$a4$, for example, are just opposite the tapping coils 11 to 14, due to the mechanical association, as shown in FIG. 2. Each multivibrator is followed by a pilot lamp 24. The multivibrator 23 serves as a retarding member with adjustable delay. This is to prevent wrong readings by extraneous shorttime-interference impulses or by transient processes in the main generator. A delay time of about 2 seconds is advisable.

The method of operation is as follows:

In normal operation, that is, with all fuses intact, the switching groups A, B, C carry alternately during the time interval of a fraction of a cycle a positive rectifier current. If group A, for example, just carries full current, the inducing magnet 15 is just opposite the coil R1. All AND-gates of group $A_0$ are consequently switched for current passage. The same holds true in a corresponding manner for the groups $B_0$ and $C_0$. All pilot lamps 24 light up. If one of the fuses blows, for example, the fuse of the current path $a3$, no magnetic field is produced in the respective core and no voltage is induced in the tapping coil 13 at this moment, while the respective reference impulse appears in R1. The associated channel $a13$, $b13$, $c13$ are thus blocked, even when the respective second input of the AND gates of group $A_0$ receives voltage from the coil R1. The associated pilot lamp remains dark and indicates thus that the rotating fuse in the current path $a3$ is defective and must be replaced by a new one.

Another gate 25 can be connected for warning signals. By another device, 26 not represented in detail, it is also possible to influence the synchronous machine. A disconnection can be effected, or a line reduction of the synchronous machine can be started.

Figure 5:
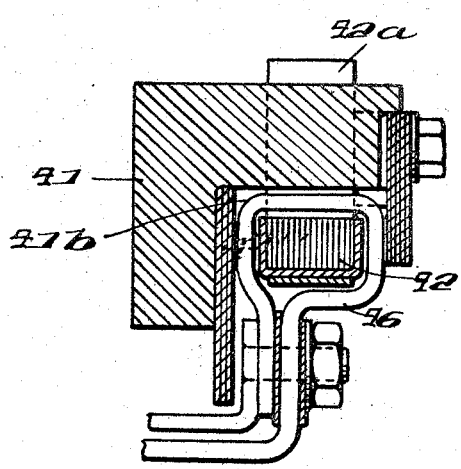

The magnetizable cores can be designed according to FIGS. 4 and 5. On the rotating carrier 1 are inserted U-shaped magnetic cores 42 for which radial slots 43 are provided on the circumference and into which the legs of the magnet core are inserted. The inserted magnet cores have noses $42b$ at their center piece. The cores are clamped over the latter on the carrier by pressing these noses against the inner edge $41b$ of the carrier by means of a wedge 44. The wedge is tightened by a screw 45, the adjoining core being clamped at the same time. 46 is the conductor of the current path by which the magnet core is magnetized.

The leg ends $42a$ are arranged opposite corresponding stationary magnets 422 of equal form. On these magnets are arranged the tapping coils 11 to 14 according to FIG. 2.

The tapping coils on the two circumferential circles are preferably arranged on rings extending concentrically to the shaft axis. These rings are adjustable in circumferential direction and make it possible to bring the tapping coils into the range of maximum magnetization. For the magnets on the circumferential circle $8a$ only a ring segment can be used, because of the small arc covered with magnets.

The impulse voltage induced in these coils has a pronounced, positive and negative voltage half-wave. This means that the input lines to the plotting channels in the AC converter 21 must meet high requirements to yield positive impulses for the input to the AND gates.

Figure 6:
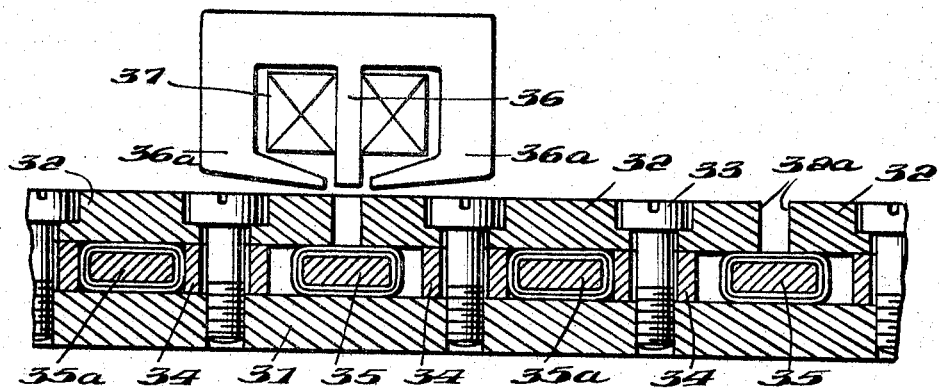
Figure 7:
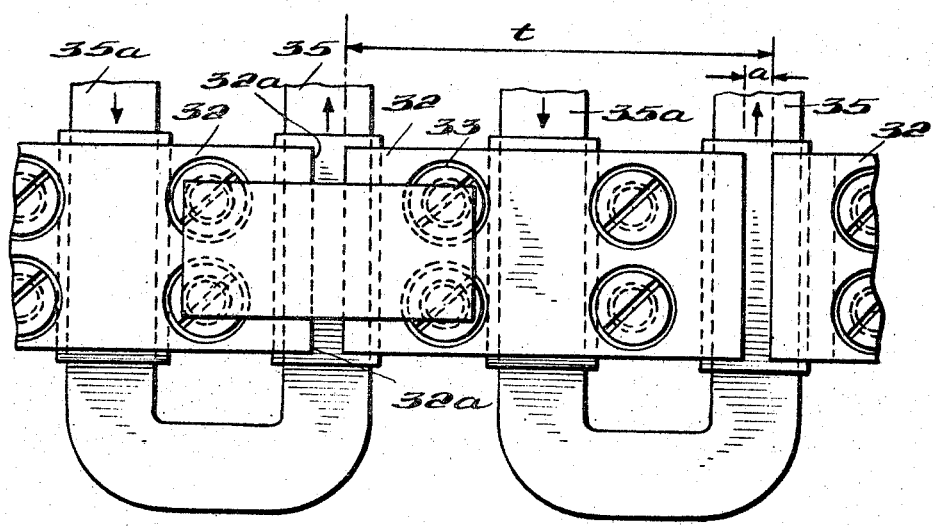

For the plotting in the plotting channels it may be desirable to obtain impulses in the tapping coils already, whose positive half wave is high and narrow, while the negative half waves are small and wide, so that they can be fed directly to the AND gate. FIGS. 6 and 7 show magnetizing cores which yield such a voltage curve and which have the form of pole plates.

On the carrier 31, represented unwound, are secured the pole plates 32 whose ends $32a$ confront each other at a certain distance apart so that an air gap $a$ is formed in whose range a magnetic stray field is produced. The fastening on the carrier is effected with countersunk screws 33 with the interposition of spacers 34. Directly under each air gap $a$ is arranged a conductor 35 which carries the current of a current path. There are $m \cdot n$ air gaps and current condutcors respectively. The respective return $35a$ of each conductor is effected in the center between the air gaps and between two associated supports 34. The prismatic tapping core 36 with the tapping coil 37 is stationary. The width of the core at the end face, that is, at the inlet point of the magnetic field, corresponds approximately to the air gap width $a$. In order to improve the magnetic conditions, that is, in order to reduce the magnetic resistance from the core to the pole plates, the tapping core has at both sides iron returns $36a$ which extend into the vicinity of the pole plates. The air gap diminishes toward the center. The ratio of the tapping core width $a$ to pole plate division $t$ depends on the required relative impulse width and is, in the present case, preferably about 1:10.

The arrangement of the tapping coils according to FIGS. 6 and 7 makes it possible to produce rectified impulses. The pole plates and the supports are simply construction elements and can be made very rugged. They can therefore absorb additional centrifugal forces so that they can be used at the same time for fastening the current conductor. Plane pole plates can be used and need not be adapted to the curvature of the carrier, at least in a great number of air gaps.

The return of the conductor 35a can extend radially to the inside, instead of again through the magnet system, and can be connected directly to one pole of the fuse. Projecting coil ends can thus be avoided.

By means of synchronous scanning, according to the invention, it is possible to monitor the various current paths of a revolving exciter-rectifier completely automatically and selectively, the failing current path being indicated exactly in the case of trouble according to switching group and position inside the switching group.

For supervising the operation it may be necessary to disconnect the monitoring plant with a reduction of the excitation, for example, when the excitation drops in idle run by 20%, so as not to simulate a fuse defect. Since direct measurement of the exciter current is not possible, the field exciter current, which is proportional to it, is used instead. To this end a minimum current relay is arranged in the exciter circuit whose operating contact effects an interruption in the plotting apparatus. The switching contact of the relay in the plotting apparatus can be connected between the multivibrator 23 and the pilot lamp 24. The feed circuit of the plotting apparatus can also be interrupted. The connection is preferably effected with delay in order to cancel the effect of sudden brief drops in the exciter current which occur in practice.

It is advisable to make the rotary and stationary cores 42 and 422 respectively in FIGS. 4 and 5, of different lengths in the direction of the rotor axis, in such a way that, when the rotor lengthens because of thermal expansion, the opposing pole faces remain unchanged in their effective size. To this end, the dimension of one pole face differs from the other pole face in axial direction by the amount of the thermal expansion.

We claim:
1. In a slip ring-free exciter arrangement for supplying the rotor winding of a synchronous electrical machine with direct current which includes a polyphase alternating current generator having an $m$ number of phases mounted on said rotor, and a rectifier group also mounted on said rotor individual to each said phase and fed therefrom, each said rectifier group being comprised of an $n$ number of paralleled rectifier paths each of which includes a rectifier element and a fuse connected in series therewith for feeding said rotor winding with direct current, an arrangement for monitoring the current flow in each said rectifier path which comprises a rotatable magnetizable core having a magnetizing winding thereon individual to each said rectifier path and connected in series therewith, said rotatable cores being mounted on said rotor in circumferential equal spaced relation and in a group sequence corresponding to the different phases of said polyphase generator whereby all of said rotatable cores in each group are magnetized simultaneously and in group succession when all rectifier current paths of all groups are operational, a first arcuate array of $n$ number of stationary equally circumferentially spaced tapping coils having the same spacing as said rotatable cores and which are located so as to be simultaneously opposite each group of said rotatable cores and in group succession thereby to induce voltage pulses simultaneously into said tapping coils, a magnetic field producing member mounted on the periphery of said rotor, an $m$ number of other stationary equally circumferentially spaced tapping coils having the same spacing as the different phases of said polyphase generator and which are located so as to be opposite said magnetic field producing member in succession thereby to induce voltage pulses therein in a sequential manner, an $m$ number of groups of plotting channels each of which contains an $n$ number of different channels, each said channel containing a dual input AND gate and signal means connected to the output of said gate, circuit means connecting said $n$ number of tapping coils to one of the AND gate inputs of a corresponding plotting channel of each group, and circuit means connecting said $m$ number of tapping coils respectively to the other inputs of the AND gates of each group of channels, whereby each of said AND gates will open to its corresponding signal means only when both inputs thereto receive voltage impulses from the corresponding tapping coils.

2. An arrangement for monitoring the current flow in the rectifier paths of the exciter circuit of an electrical synchronous machine as defined in claim 1 wherein said rotatable magnetizable cores are U-shaped and said $n$ number of stationary tapping coils are placed on U-shaped magnetizable stationary cores, the legs of said rotatable and stationary U-shaped cores confronting each other as said rotor rotates.

3. An arrangement as defined in claim 2 wherein said U-shaped magnetizable cores are provided with nose portions and which further includes wedge means engageable with said nose portions for securing said cores in place.

4. A monitoring arrangement as defined in claim 1 wherein said rotatable magnetizable cores are constituted from a series of pole plates, the end of adjacent pole plates being spaced from one another to establish air gaps therebetween, and the current conductors of said current paths are located respectively between said gaps and the body of said rotor, and wherein said tapping coils correlated to said magnetizable cores are mounted on cores which have a prismatic base the width of which corresponds substantially to the length of said air gap between said pole plates.

5. A monitoring arrangement as defined in claim 1 wherein said tapping coils are supported on a ring or ring segment and are adjustable in a circumferential direction.

6. A monitoring arrangement as defined in claim 1 and which further includes a minimum current relay arranged in the exciter circuit, and wherein the contacts of said relay serve to disconnect said plotting channels.

7. A monitoring arrangement as defined in claim 1 wherein stationary magnetizable cores are also provided for said stationary tapping coils, and the respective dimensions of the pole faces of said rotatable and stationary cores in the axial direction differ from one another by an amount at least equal to the thermal expansion of said rotor.

References Cited

UNITED STATES PATENTS 3,303,410   2/1967   Hoover et al. ---------- 322—99

ORIS L. RADER, *Primary Examiner.*

H. HUBERFELD, *Assistant Examiner.*

U.S. Cl. X.R.

324—158; 346—33